United States Patent Office 2,772,955
Patented Dec. 4, 1956

2,772,955

PROCESS FOR THE PRODUCTION OF HYDROGEN AND CARBON MONOXIDE FROM LIQUID FUELS (HEAVY MINERAL OILS)

Giacomo Fauser, Milan, Italy, assignor to Montecatini, società generale per l'Industria Mineraria e Chimica, a corporation of Italy No Drawing. Application July 6, 1953,
Serial No. 366,378

Claims priority, application Italy July 11, 1952

11 Claims. (Cl. 48—215)

The industrial syntheses of ammonia and of methanol require large quantities of hydrogen and of carbon monoxide, which are prevailingly obtained, still at present, by means of the gasification of coke. The price of coke is sensibly higher than that of other fuels and has considerable bearing on the cost of the ammonia produced. Petroleum refineries instead have available considerable quantities of residues of distillation of mineral oil and heavy fractions of liquid hydrocarbons coming from "cracking" plants, and those fuels are sold at much lower price than coke of equal heat value.

It is an object of the present invention just to obtain hydrogen and carbon monoxide from these low-grade liquid fuels.

There are already known processes for obtaining synthesis gas from light liquid hydrocarbons easy to be vaporized; said processes consist in general in reacting the vapours of hydrocarbons with oxygen or steam in the presence of catalytic masses kept at elevated temperature. Said processes however are not applicable to heavy liquid fuels because these cannot be obtained in the vapour state owing to their heat instability. The latter is the greater the higher the molecular weight of the hydrocarbons, so that dense liquid fuels decompose before attaining the distillation temperature.

The carbon that separates deposits on the catalyst, rapidly spoiling the activity of the latter and causing the clogging of the catalytic furnace in a short time. Owing to these difficulties, the preparation of synthesis gas by catalytic reaction of mineral oils with oxygen and steam has been limited so far industrially to the use of hydrocarbons with from three to four carbon atoms in their molecule.

However, the elevated cost of these oils renders the operation too burdensome, while it is evident that the economical significance of processing depends essentially on the possibility of employing low cost liquid fuels.

On the other hand, to avoid the formation of carbon black, the mixing of oil, steam and oxygen has to be effected in a perfect manner. The ideal solution of the problem would consist in subdividing the oil into microscopic droplets distributing them in the reaction chamber in a very short time in such a manner as to accomplish a perfectly homogeneous mixture with steam and with oxygen. In these ideal conditions, every droplet would react, prior to attaining the temperature of dissociation, with the quantity of oxygen and of steam necessary to effect the integral conversion of the hydrocarbon into $H_2$ and $CO$.

These conditions can be obtained in practice only with gaseous fuels, which can mix in a perfect manner with steam and oxygen prior to introducing them into the reaction chamber. On the contrary, if using dense oils it is not possible to avoid that the strong temperature rise taking place at the time of introducing the droplets into the furnace may produce a "cracking" of the instable hydrocarbons, with carbon black separation.

The elemental carbon particles should react with the steam present in the gas, according to the known equation:

$$C + H_2O = H_2 + CO$$

but in the absence of catalysts this reaction does not proceed with sufficient speed and, in that case, the gases contain relevant amounts of carbon black. In order to obviate that inconvenience, it was proposed to separate the carbon black dragged by the gases at the exit of the reaction furnace and after addition of iron and nickel catalysts to put it back into the furnace together with the oil, oxygen and steam mixture. However, this process requires evident complications in the apparatus equipment needed to put it into practice and, on the other hand, the activity of the aforesaid catalysts is rapidly spoilt by sulfur, always present to notable percentages in low-grade liquid fuels.

It was proposed at last to atomize the liquid hydrocarbon in superheated steam and to pass said mixture over a nickel catalyst at more than about 650° C., after previous heating to about 400° C.

Also this method, which is substantially distinct from the present process, offers the inconveniences mentioned above, when rather heavy, that is to say less gasifiable liquid hydrocarbons are to be treated.

Now it is an object of the present invention to provide a practical process for producing hydrogen and carbon monoxide from dense liquid fuels without incurring the inconveniences mentioned above, by means of a very simple apparatus equipment. The process consists essentially in admixing to the mineral oil small quantities of determined catalytic substances prior to reacting it with a mixture of oxygen and steam in a furnace kept at high temperature.

To achieve an elevated yield of gasification it is necessary to pre-heat the steam and oxygen to the maximum temperature compatible with the resistance of the steels employed in the construction of the heat exchangers, viz. to 600–700° C.

In practice, this super-heating is effected economically at the expense of the heat of the synthesis gases leaving the reaction furnace. Instead, the fuel oil will have to be pre-heated to a temperature compatible with its heat-stability in order to prevent it from decomposing in the pre-heating apparatus. Generally 100–150° C. suffice to obtain a fluidity sufficient to achieve a satisfactory atomization of the liquid fuel.

Satisfactory results are obtained by injecting contemporaneously oil and steam under a pressure of some atmospheres in a nozzle provided with small holes so as to generate a series of thin diverging jets. One succeeds in this way in incorporating the fuel in the state of mist with the steam and this is admixed to oxygen while imparting to the gases a strong whirling movement so as to ensure uniform distribution of oil in the gaseous mass. Having to attain elevated production, it is advisable to introduce the oil and steam mixture and the oxygen into the reaction chamber by means of numerous nozzles in order that the distribution of the fuel in the mass of the reacting gases may turn out to be more homogeneous and uniform.

In fact it has been found that the formation of carbon black can be practically suppressed in the gases produced by reacting dense liquid fuels with oxygen and steam if the oil is admixed with small quantities of salts of the earth-alkaline metals. Satisfactory results are already obtained, e. g., by adding as little as 1 g. of calcium or magnesium nitrate per litre of mineral oil. Of course the salt should be distributed very carefully in the mass of the liquid fuel; said operation may be carried out by mixing the finely powdered salt, in order that it may remain in suspension in the oil, or by dissolving the salt in water and injecting the solution together with the oil into the burner.

The amount of catalyst employed being minimal, it affects the cost of the produced gas to negligible extent.

The reactions giving rise to the production of CO and $H_2$ can be summarized in the following equations:

$$C_mH_n + \frac{m}{2}O_2 = mCO = \frac{n}{2}H_2;$$

$$C_mH_n + mH_2O = mCO + \frac{2m+n}{2}H_2$$

While the first reaction is exothermic, the second instead is strongly endothermic; hence, by adjusting conveniently the proportions of fuel oil, oxygen and steam in respect to one another, it is possible to keep the desired temperature in the furnace.

Of course, the conversion of oil into CO and $H_2$ is all the more rapid and complete, the higher the temperature in the furnace is, because it is known that the increase of temperature accelerates the velocity of reaction. In order to obtain in the produced gases a final $CH_4$ content lower than 0.3%, the temperature must be higher than 1100° C.

The following example is given merely by way of illustration without limitation.

*Example*

The naphtha is preheated up to 100° C. by means of steam in a surface exchanger, then injected by a pump into the nozzle-carrying tube of the burner. By another pump, calcium nitrate is introduced in the form of a 20% solution, is injected into the same nozzle-carrying tube of the burner, the ratio being 2 g. of $Ca(NO_3)_2$: 1 kg. of naphtha. Together with the naphtha there is introduced superheated steam at 300° C., the ratio being 0.6 kg. of steam: 1 kg. of naphtha.

In this way a thorough mixing of the catalyst within the naphtha and a fine atomization of the mixture are obtained. By means of a fan, oxygen is introduced into the burner, the ratio being 0.8 Nm³ of $O_2$: 1 kg. of naphtha. Together with the oxygen there is introduced superheated steam at 300° C., the ratio being 0.4 kg. of steam: 1 kg. of naphtha.

The temperature in the zone of the flame is 1200° C.

From 1 ton of heavy fuel oil for boilers, having a specific weight at 20° C. of 0.95; a heat value higher than 9800 K. cal./kg.: a viscosity at 50° C. of 17° E; a sulfur content of 2.9%; one obtains 3100 Nm³ of gas having the following composition:

$CO_2$, 12.3%; CO, 36.6%; $H_2$, 47.3% $CH_4$, 0.3%; $N_2$, 3%; $H_2S$, 0.5%

The quantity of oxygen and steam required for the gasifying of one ton of liquid fuel oscillate about an overall figure of 750m³ and 950 kg.

A gas having the aforesaid composition is particularly well-suited for the production of ammonia, since the small content of methane permits to avoid fractionating of the gases at low temperature.

The nitrogen required for the synthesis of ammonia may be produced economically by employing, for the gasification of the fuel oil, oxygenated air instead of pure oxygen.

What I claim is:

1. A process for the production of a synthesis gas consisting substantially of carbon monoxide and hydrogen, said process comprising preheating heavy mineral oil to a temperature of the order of 100 to 150° C., intimately admixing therewith a catalytic amount of a chemical selected from the group consisting of calcium nitrate and magnesium nitrate, atomizing said admixture into an atmosphere of steam and oxygen preheated to a temperature of at least 300° C. and not more than 600 to 700° C., permitting the reaction to take place and adjusting the proportions between said heavy mineral oil, steam and oxygen to maintain a reaction temperature between 1100 and 1200° C.

2. The process according to claim 1, wherein a mixture of said steam and oxygen is preheated in heat-exchange with reacted gases.

3. The process according to claim 1, wherein said steam and oxygen are separately preheated.

4. The process according to claim 1, wherein said catalytic amount of a chemical selected from the group consisting of calcium nitrate and magnesium nitrate is added to said heavy mineral oil in form of a solution, prior to atomizing the admixture.

5. The process according to claim 1, wherein said catalytic amount of a chemical selected from the group consisting of calcium nitrate and magnesium nitrate is of the order of 1 to 2 g., in 20% aqueous solution, per 1 kg. of said heavy mineral oil.

6. The process according to claim 1, wherein said chemical is calcium nitrate.

7. A process for the production of a synthesis gas comprising substantially hydrogen and carbon monoxide and being free from carbonaceous matter, said process comprising preheating liquid oil fractions constituting the heavy residues in the distillation of mineral oils to a temperature of the order of 100 to 150° C., intimately admixing therewith a catalytic amount of a chemical selected from the group consisting of calcium nitrate and magnesium nitrate, atomizing said admixture into an atmosphere of steam and oxygen preheated to a temperature of at least 300° C. and not more than 600 to 700° C., permitting the reaction to take place and adjusting the proportions between said heavy mineral oil, steam and oxygen to maintain a reaction temperature between 1100 and 1200° C.

8. A process for the production of a synthesis gas comprising substantially hydrogen and carbon monoxide and being free from carbonaceous matter, said process comprising preheating liquid oil fractions constituting the heavy residues resulting from cracking liquid hydrocarbons to a temperature of the order of 100 to 150° C., intimately admixing therewith a catalytic amount of a chemical selected from the group consisting of calcium nitrate and magnesium nitrate, atomizing said admixture into an atmosphere of steam and oxygen preheated to a temperature of at least 300° C. and not more than 600 to 700° C., permitting the reaction to take place and adjusting the proportions between said heavy mineral oil, steam and oxygen to maintain a reaction temperature between 1100 and 1200° C.

9. A process for the production of a synthesis gas comprising substantially hydrogen and carbon monoxide, said synthesis gas being free from carbonaceous matter, by preheating the heavy liquid residues obtained in distilling and cracking mineral oil to a temperature of the order of 100 to 150° C., injecting said preheated residues in form of minute diverging jets into a reaction chamber together with an intimately dispersed catalytic amount of a chemical selected from the group consisting of calcium nitrate and magnesium nitrate, injecting minute diverging jets of superheated steam at a temperature of about 300° C. into said reaction chamber, introducing oxygen heated to about 300° C. in a whirling movement into said reaction chamber so as to assure a uniform distribution of minute droplets of said residues within the reaction chamber, permitting the reaction to take place and adjusting the proportions between said residues, steam and oxygen to maintain a reaction temperature between 1100 and 1200° C.

10. A process according to claim 9 for the production of a synthesis gas comprising substantially hydrogen, carbon monoxide and nitrogen, said synthesis gas being free from carbonaceous matter and suitable for ammonia production, wherein said oxygen is replaced by oxygenated air.

11. A process according to claim 9, wherein the ratio of the reactants is 1 kg. of steam and 0.8 Nm³ of oxygen per 1 kg. of naphtha.

References Cited in the file of this patent

UNITED STATES PATENTS

| | | |
|---|---|---|
| 1,772,652 | White | Aug. 12, 1930 |
| 1,943,821 | Hanks et al. | Jan. 16, 1934 |

FOREIGN PATENTS

| | | |
|---|---|---|
| 255,423 | Great Britain | Aug. 19, 1927 |
| 673,333 | Great Britain | Sept. 7, 1950 |
| 10,612 | Australia | Aug. 17, 1933 |

OTHER REFERENCES

Ser. No. 303,852, Szigeth (A. P. C.), published Apr. 27, 1943.